Inventor
Theodore P. Hall
By
Attorney

July 31, 1951 — T. P. HALL — 2,562,491
FLYING AUTOMOBILE
Filed July 26, 1947 — 3 Sheets-Sheet 2
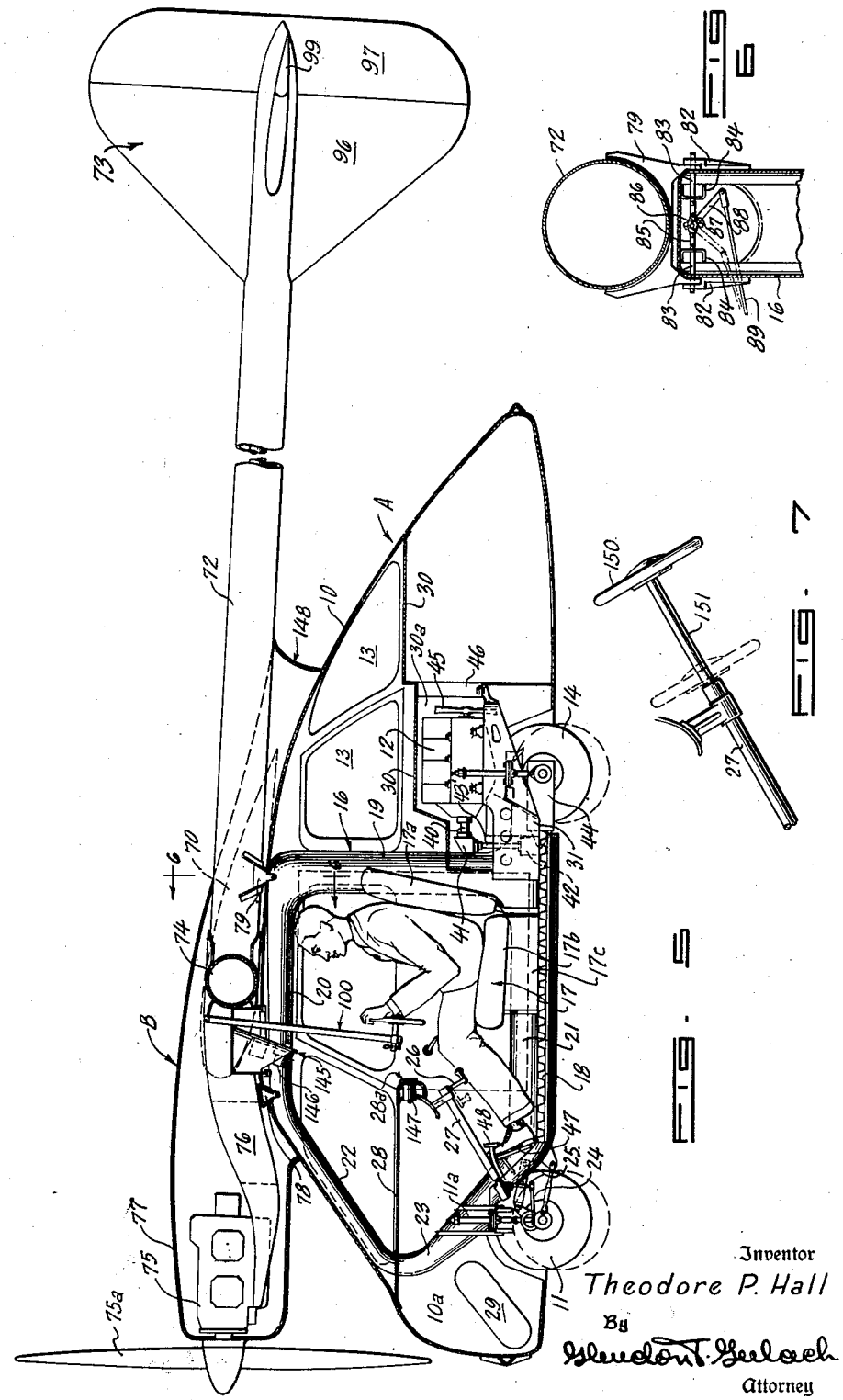
Inventor
Theodore P. Hall
By
Attorney

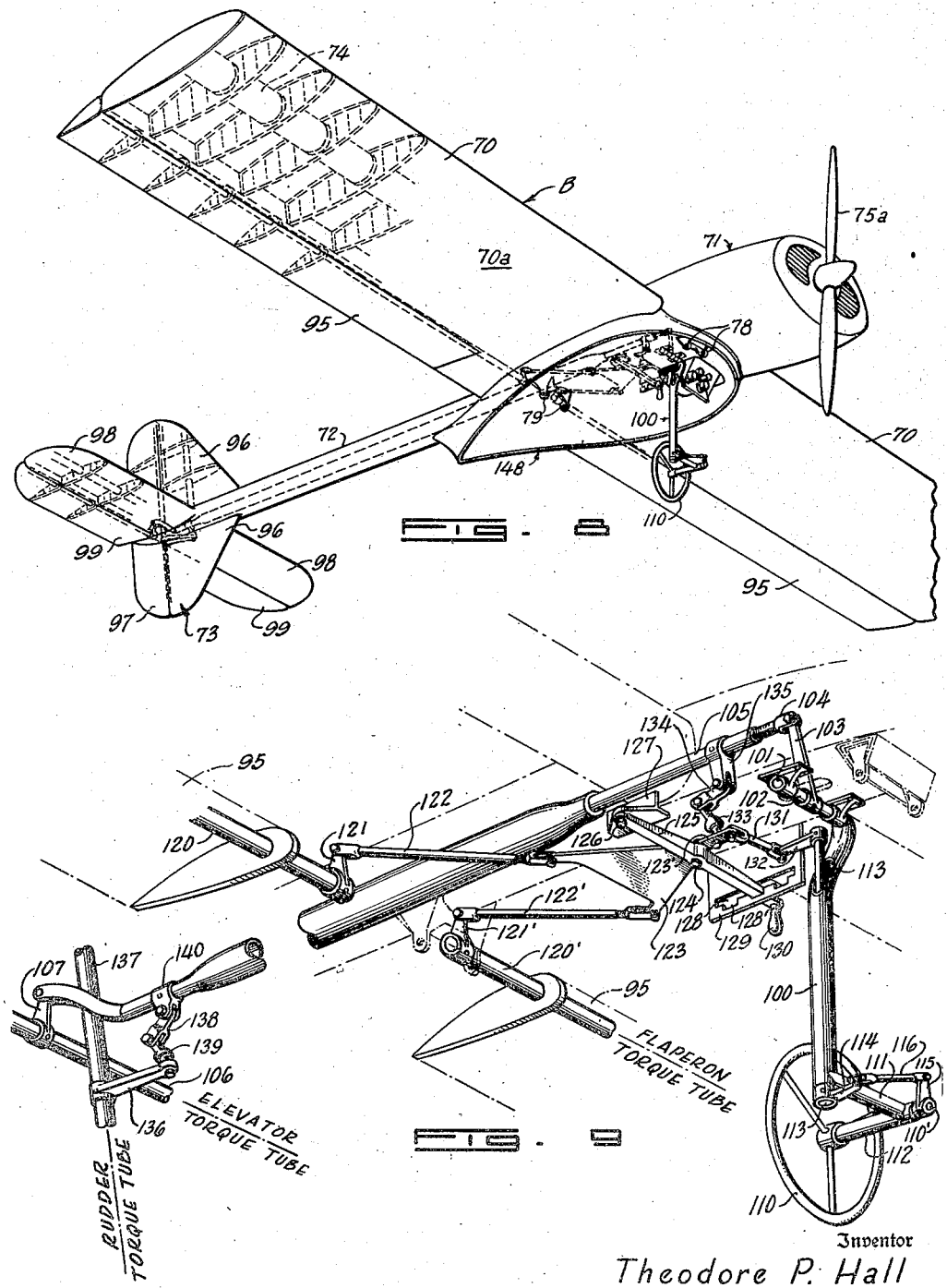

Patented July 31, 1951

2,562,491

UNITED STATES PATENT OFFICE 2,562,491

FLYING AUTOMOBILE

Theodore P. Hall, San Diego, Calif.

Application July 26, 1947, Serial No. 763,859

1 Claim. (Cl. 244—2)

This invention relates to automotive vehicles adapted to become airborne by the attachment of a novel form of flight component.

The utility of flying automobiles is well recognized and in striving to effect a vehicle of this type having a maximum of efficiency both as an aircraft and as a land vehicle troublesome structural problems are encountered by reason of the fact that the design criteria for aircraft are radically different than for automotive vehicles. In the design or aircraft it is particularly essential to minimize gross weight and reduce overall dimensions in order to obtain optimum performance. It has been found necessary in prior proposals of this type of flying vehicle to compromise the characteristics and design of the automotive vehicle in favor of the airborne unit. The present invention contemplates a combination automobile and aircraft in which the gross weight of the vehicle is kept within practical limits as a useful airplane, and the characteristics of the automotive component meet conventional automobile specifications while being considerably lighter by reason of a novel arrangement of load distribution and structural members.

The present invention also contemplates the complete independency of the flight component and its controls from the automotive unit. Earlier proposals have combined their flight and automotive controls and instruments in such a manner that operation of the vehicle as an automobile or as an airplane has been complicated by the presence of unfamiliar or unnecessary controls when in one situation or another. At the same time, the inter-dependency of the control systems in prior designs complicates the conversion of the vehicle from an airplane to an automobile or vice-versa and obviously increases the possibility of failures and accidents due to improper rigging or mal-functioning of the controls.

The primary object of this invention therefore is to provide a ground vehicle meeting the performance specifications of modern automobiles and adapted to become airborne by the attachment of an independently provided flight component.

Another object of the invention is to provide an automotive vehicle adapted to be airborne and in which stability, comfort, and safety characteristics are held to a maximum while weight is minimized through the arrangement of the structure and the distribution of loads.

A further object of this invention is to provide an improved combination automobile-aircraft comprising a powered unit for ground travel and a readily attachable flight section having its own power plant and controls.

A still further object is the provision of an attachable flight section for an automobile containing all of the elements essential for flight including propeller, power plant, instruments and flight controls.

A still further object of the invention is to provide in a flying automobile comprising an automotive component and a flight component having separate control systems and power plants, an improved arrangement whereby these components may be easily and efficiently joined or disconnected without interconnection of said control systems and power plants.

Other objects of the invention and its various characteristics and advantages will be readily apparent from consideration of the following detailed description and drawings which form a part of this disclosure and in which like numerals of reference denote corresponding parts throughout the several views.

The invention consists in the several novel features which are hereinafter set forth and are more particularly defined by claims at the conclusion thereof.

In the drawings:

Figure 5 is a section of the vehicle with the flight component in assembled relation, illustrating the major elements and the arrangement of the principal loads and structural members;

Figure 6 is a section on line 6—6 of Figure 5 illustrating a typical form of attachment between the automotive and flight components;

Figure 7 is a detail showing an alternative arrangement of the steering wheel of the automotive component;

Figure 8 is a perspective of the flight component illustrating the general arrangement of the structure and the flight control system; and Figure 9 is an enlarged perspective of the flight control system with certain portions broken away for the purpose of clarity.

Figure 1:
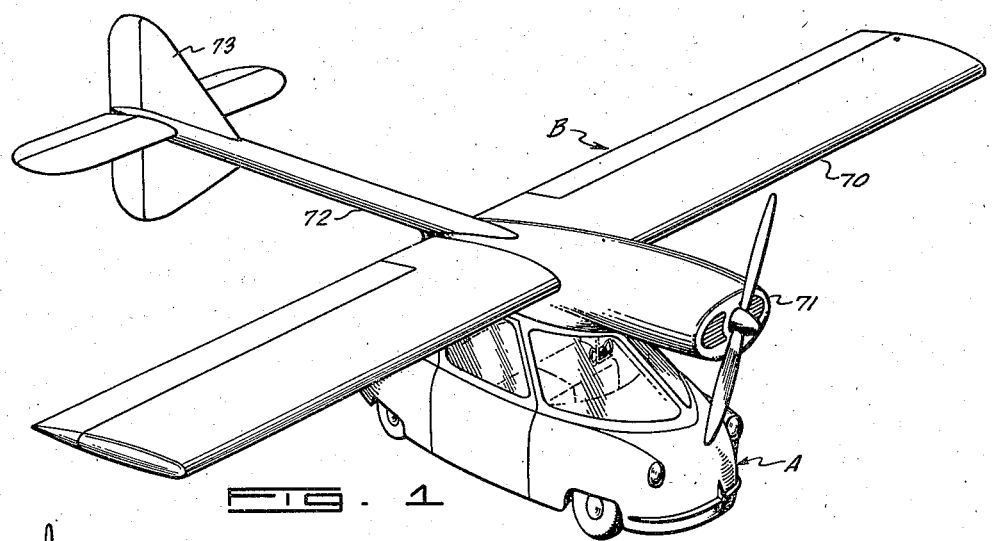
Figure 1 is a perspective view of an airborne vehicle constructed in accordance with the present invention.
Figure 2:
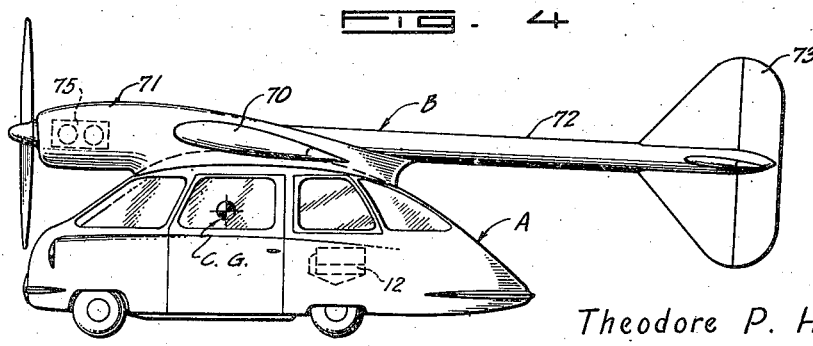
Figure 2 is a side elevation of the assembled airborne vehicle illustrating the disposition of the major elements and the location of the center of gravity.

The invention consists essentially of an automobile A as illustrated in the drawings, designed and constructed to perform the conventional functions of such a vehicle, and which in addition may be airborne by the attachment of a flight section B, the combination being shown in Figures 1, 2, and 5.

As illustrated in the drawings, the automobile unit A of the invention is arranged for a driver and passenger in conventional side-by-side relationship, but if desired the principles of this invention may be embodied as advantageously in other seating arrangements accommodating additional passengers or seats other than the pilot's may be omitted and provision made for various dispositions of cargo. The automotive unit A may be designed to serve a number of purposes, for example, as a light delivery vehicle, or as an armored, reconaissance, or ambulance car for military purposes. The principal objective of the invention, however, is to provide a safe, comfortable vehicle having the combined utility of the conventional automobile and airplane. To this end, it is provided with an enclosed body 10, a pair of forward steerable wheels 11, and a rearwardly disposed engine 12 for driving the vehicle through ground engagement of a pair of drive wheels 14. The body portion 10 is of streamlined shape and is provided with front, side and rear windows 13 to permit optimum visibility. The external dimensions of the body 10 are somewhat less than for conventional automobiles of the same general capacity this being made possible without an attendant decrease in the internal dimensions because of the arrangement of the structure and elements as will be explained below. The reduction in overall size and weight of the vehicle improves its maneuverability as an automobile and, of course, reduces drag when airborne.

It is well understood in the automotive art, that the center of gravity of a road vehicle should be as low as possible for stability and as nearly as possible to the mid-point between the wheels to provide optimum riding qualities. In the present embodiment, these conditions are obtained by the disposition of the power plant 12 in the rear of the vehicle, and the arrangement of the occupants, controls, structure, etc., so that the center of gravity approximates the position indicated in Figure 4 by the symbol C. G.

Because of the structural arrangement, the compact arrangement of the elements, and the use of materials having high strength-weight ratios, the gross weight of the automobile as herein described is kept low in comparison to that of comparable automobiles of present design. For example, it has been found that an automobile constructed in accordance with the principles of this invention may be designed to have a gross weight, empty, of approximately 900 pounds as compared to conventional automobiles of comparable characteristics which have a gross weight of approximately 3000 pounds. As a result of this considerable reduction in weight, a smaller power plant is permissible to provide equivalent speed and power performance, and this in itself contributes to weight reduction as well as economy of operation. We have determined that an automobile embodying the present invention and having the above gross weight provides comparable performance when powered with an engine of 25–30 rated horsepower, as against 85–100 horsepower engines used in present conventional automobiles.

With particular reference to Figure 5, the automobile A comprises essentially a generally D-shaped tubular steel frame 16, which serves as a central structure to support all of the principal loads including the body 10, the wheels 11 and 14, the engine 12, a floor structure 18, and a seat 17. The frame 16 has a vertical central member 19, upper and lower horizontal members 20 and 21 respectively, and upper and lower inclined members 22 and 23 which complete the frame and form a rigid structure. The wheels 11 are suspended by suitable hydraulic assemblies 11a, which assemblies 11a are supported from the lower end of the member 23. The particular construction of these assemblies forms no part of the present invention. The wheels 11 are controllable to steer the automobile A on the ground by means of a convention tie rod (not shown) which is moved through a steering link 24 and an arm 25, which arm 25 is reciprocally movable in response to rotation of a steering lever 26 supported by a steering column 27.

The body 10 is primarily a shell or sheath which will bear but small loads and which therefore can be built of a minimum weight material such as Duralumin or as an alternative, of a high strength laminate such as, for example, fiber glass cloth impregnated with a thermosetting resin. The body 10 is supported along its fore-and-aft centerline by suitable attachment to the frame 16. The floor structure 18 may be of Duralumin or of high strength laminate and is preferably of a corrugated form, as shown, to promote lateral rigidity. It is attached, in suitable manner, to the lower frame member 21 of frame 16 and to the sides of the body 10 for support transversely and effects an efficient structure. The body 10 is provided with a forward deck 28 having a depending portion 28a at its rearward edge forming an instrument panel and to define the driving compartment. A spare wheel and tire 29 is mounted in the forward space 10a within the body 10 and beneath the deck 28. A rear deck 30 is supported between the sides of the body 10 and the central vertical frame member 19 to define an engine compartment 30a below it, and to serve as a support for luggage.

A seat 17 is provided forward of vertical frame member 19 and consists essentially of upholstered back and seat portions 17a and 17b respectively, supported on a generally box-like frame 17c, which is welded or otherwise attached to the lower frame member 21 and to the floor structure 18 to form a rigid seat structure and to contribute to the transverse strength of the body.

The engine 12 and the drive wheels 14 with their suspension system are supported by a rearwardly extending cantilever structure 31 which is suitably attached by bolts or welding to the lower end of the central vertical frame member 19, in such a manner that the load of the power plant and rear drive system are transmitted to the frame 16. The engine may be of either the air or water cooled types and disposed with its principal axis in either the fore-and-aft direction, or else transversely of the vehicle. In the present instance, a water cooled type is illustrated, mounted with its drive shaft 40 directed towards the front of the vehicle. Power from the engine is transmitted to the drive wheels 14 through upper and lower right angled drive units 41 and 42 respectively, an intermediate shaft 43 and a suitable combined clutch, transmission, and differential gear assembly 44. Whereas the power plant location and manner of support and the drive arrangement may be varied without departing from the spirit of the invention, the method and manner illustrated and herein described provides a particularly compact and efficient arrangement which is well adapted to the overall specifications and characteristics of the present vehicle.

Because of the relatively low power requirements of the automobile of the present invention, ample power range may be obtained for all practical purposes by the use of a transmission 44 having but two speeds forward and one in reverse in distinction to the conventional automotive types in which the gross weights of the vehicle require three speed ratios to obtain comparable performance. The use of a two-speed transmission contributes to weight reduction and simplifies driving control, since the automobile may be started and driven on level or moderate inclines without shifting gears with the second or low speed being used only for unusual power demands.

Water cooling is provided in the present embodiment by a conventional engine driven fan 45 and a radiator 46 which is supported by suitable brackets on the rear end of the cantilever structure 31.

The controls of the present automobile are identical in location, operation and function as in conventional automobiles to eliminate need for additional training in the use of the vehicle as an automobile and to fully utilize the normal reactions of the trained automobile driver. They include in addition to the steering lever 26, a foot accelerator 47, a clutch pedal 48 operatively connected by suitable mechanism to the transmission 44 for response to actuation by the driver's left foot, a hand actuated gear shift (not shown), and a brake pedal located for operation by the right foot of the driver to control a conventional 4-wheeled brake system associated with the forward wheels 11 and power wheels 14. In conformance with the other aspects of the automobile of the present invention wherein power and strength have been pointed out as being primary considerations, therefore because of the general strength-weight efficiency of the whole structural arrangement, the brake system components may be smaller and consequently lighter, even though conventional in function.

The invention as thus far described exemplifies a light, compact automotive type vehicle providing the equivalent characteristics and performance of the modern automobile in respect to strength, safety, comfort, ease of operation, and utility at greatly reduced gross weight and somewhat reduced overall dimensions. It is characterized by the use of a generally D-shaped frame member disposed on the fore-and-aft centerline of the vehicle, from which all of the principal loads are supported including the body, the wheels, the power plant, and the occupants. By reason of the central support of the main loads, an enclosed body which is primarily a shell made of high-strength, low-weight materials, is used in combination with similarly constructed floor and seat sections to form a unitary body and frame assembly of high efficiency.

While the vehicle described is comparable in every way with conventional performance specifications for a light automobile, it also conforms to the practical requirements for the passenger and load carrying portions of a light airplane, and is suited aerodynamically and from a weight standpoint to become airborne particularly when utilized in conjunction with a flight component B as shown and described hereafter, although it is to be understood that this presents but one form of flight component, and that this may be varied or modified in many respects without departing from the scope of the invention.

Having particular reference to Figures 1, 3, 5 and 8, the flight component B is shown consisting essentially of a pair of wings 70, a cowled tractor-mounted power plant 71, a tail boom 72, and an empennage 73.

The primary structure of the flight component B comprises a tubular wing spar 74 supporting a series of suitable airfoil shaped ribs (as indicated in dotted lines in Figure 8) and a usual skin 70a. The tubular tail boom 72 supports the empennage 73 and its controls. The power plant 71 consists of an engine 75, supported on a pair of cantilever engine bearers 76 from the intersection of the spar 74 and tail boom 72, a propeller 75a and a streamlined cowl 77.

It is to be noted that the principal loads of the flight component are transmitted through the tubular wing spar 74 and the tubular tail boom 72 and concentrated at their intersection, the arrangement being particularly advantageous for the attachment at the same location to the automobile component A. This is accomplished through a pair of laterally spaced forward attachment fittings 78, and a pair of rear laterally spaced attachment fittings 79, both pairs of which are rigidly attached to the fore-and-aft structure of the flight component B. These fittings effect a positive connection between the automobile component A and the flight component B and serve also to locate positively the one with respect to the other.

With the flight component B assembled to the automobile component A, a vehicle is formed which may be characterized generally as a high-wing tractor monoplane, a type of aircraft which is particularly adapted for moderate performance passenger travel because of its stability, visibility, and advantageous landing and take-off characteristics. In aircraft of this type, it is essential to good stability and flight performance that the center of gravity be located as low and as near to the center of pressure of the wing as possible. In available airfoil sections applicable to the present invention the center of pressure of the wing occurs at or near 30% of the mean aerodynamic chord. We have found that with the arrangement described herein, the center of gravity of the combined automobile-airplane is located at about 27% mean aerodynamic chord when the vehicle is fully loaded and is sufficiently low as illustrated in Figure 2 to provide optimum flight characteristics. The rearward location of the motor 12 in the automobile component A to oppose the forward location of the flight engine 75 advantageously positions two of the principal loads and tends to effect a desirable location of the center of gravity therebetween. Location of the seating means 17 forwardly of motor 12 and disposal of the wings 70 substantially directly over seat 17 locates two other principal load sources favorable to the maintenance of a low C. G.

A further requirement of weight distribution is that the center of gravity location of the aircraft does not vary considerably in the event of different arrangements or change in the disposable load, i. e., passengers, baggage, and fuel. In the present arrangement, since these elements are located at or near the center of pressure of the wing, we have found it possible to limit the horizontal movement of the center of gravity to within the limits of good aircraft design.

Figure 6 illustrates a preferred form of mechanism for quickly and positively latching or connecting the automotive component A to the flight component B. In the connecting operation, the flight component B is suspended on jacks or by means of a hoist (not shown), and the automobile A is driven or positioned under it so that the forward and rear attachment fittings 78 and 79 are located over attachment openings 80 and 81 (Figure 4) provided in the top of the body 10. The flight component B is then lowered so that the attachment fittings 78 and 79 engage pairs of lugs, as indicated at 82, attached to the upper horizontally disposed frame member 20. As shown in Figure 6, to service the rear attachment fittings 79, a pair of pins 83, journaled in suitable bearing members 84 within the upper frame member 20, are retractable through aligned holes in the lugs 82 and upper frame member 20 to engage holes in the attachment fittings 79 to form a positive lock therewith. The pins 83 are attached through horizontally movable links 85 to a toggle 86. A similar locking arrangement is provided at the forward attachment fittings 78. The toggles 86 at the front and rear attachment locations are fixed to a common shaft 87, suitably supported for rotation on the inside wall of upper frame member 20. A bell crank 88 is fixed to the shaft 87 so that rotation thereof by a manually operable control rod 89 retracts or extends the pins 83 to lock or unlock the automobile and flight components through the attachment fittings 78 and 79.

An important feature of the present invention which is here particularly stressed is the independence of the control system of the flight component B from that of the automobile component A. To effect this independence a two-control system is employed in place of the more conventional three-control system wherein aileron, rudder and elevator surfaces are provided under the control of independent actuating systems. In the latter case, it is usual to actuate the ailerons and elevators for horizontal and longitudinal control by differential movement of a control stick or wheel, and to actuate the rudder for directional control by foot pedals. Since the foot pedal positions of the present invention are utilized for clutch and brake control of the automobile unit, we prefer to utilize a flight control system in which the rudder and ailerons are coordinated in such a manner that horizontal and directional controls are combined and actuated through a single system. By so providing, complete flight control of the vehicle can be provided from a single overhead type control column 100 which depends from and is supported by the structure of the flight component B, in such a manner that when the flight component B is in assembled relation to the automotive unit A, the control column 100 projects through a normally covered opening 90 in the body 10 and will be positioned in proper relation to the driver to permit complete and effective flight control of the vehicle.

The operation and function of two-control flight systems are well understood in the art, and the specific form thereof shown and described herein exemplifies an embodiment which provides advantages which are particularly evident in combination with other features of this invention. However, it is not to be understood that the invention is limited to the particular flight control system shown since there are many forms of combined flight control systems which may be used and are contemplated as within the scope of this invention.

With particular reference to Figure 8, the wings 79 are shown provided with control surfaces 95 pivotally connected at the trailing edge thereof, serving to provide horizontal control of the airborne vehicle when moved differentially or as ailerons. To eliminate the necessity of flaps or other high lift devices, provision is made in the present embodiment to "droop" the surfaces 95, i. e., to depress them simultaneously, while at the same time permitting differential action. As is well understood and accepted in the art, control surfaces so characterized are known as "flaperons."

The empennage 73 consists essentially of a fixed vertical fin 96, to which a rudder 97 is pivotally attached at its trailing edge, and a fixed horizontal stabilizer 98 supporting a pair of elevators 99 which are adapted for simultaneous vertical movement for controlling the longitudinal direction of the airborne vehicle.

The details of the system for actuating the flight control surfaces are most clearly illustrated in Figure 9. As shown, the control column 100 is suspended from bearings 101, provided on the flight component structure, for fore and aft movement about a cross-shaft 102. A lever 103 affixed to the cross-shaft 102 for rotation therewith is pivotally atached at its upper end through a clevis 104 to the elevator control tube 105. Rotation of the link 103 in response to the fore-and-aft movement of the control column 100 moves the elevator control tube 105 longitudinally or in a fore-and-aft direction to rotate the elevator torque tube 106, through a bell crank 107. The elevator torque tube 106 is connected to the elevators 99 to deflect them upwards when the control column 100 is moved aft, and downwards when the control column is moved forward, to effect longitudinal control of the airborne vehicle. Tube 105 is suitably mounted for rotative movement for operation of the rudder 97; the interconnection of tube 105 and rudder 97 will be hereinafter described.

Coordinated control of the flaperons 95 and the rudder 97 is provided through a control wheel 110, which is supported to one side of the lower end of the control column 100, as best shown in Figure 9, by a transverse support tube 111 and a horizontal fore-and-aft extension 112, which houses the control wheel axle 110'. A shaft 113 supported axially of the control column 100 is adapted for rotation in response to rotation of the control wheel 110, through a pair of bell cranks 114 and 115, pinned respectively to the lower end of the shaft 113 and the control wheel axle 110', and interconnected by a link 116.

The flaperons 95 are adapted to be pivotally moved by the torque tubes 120 and 120', which tubes are operatively connected to the rearwardly projecting corners of a generally triangular plate member 123 through adjustable links 122 and 122'. The plate member 123 is pivotally supported at 124 on a transverse arm 125, one end of which arm is supported on a pivot 126, in a rigidly fixed bracket 127 and is swingable horizontally about the pivot 126. The free end of the arm 125 extends through a slot 128 in a depending fixed support bracket 129, and is provided with a control handle 130. By means of the handle 130, the arm 125 may be moved about its pivot 126 in a fore-and-aft direction, and may be restrained in any of a plurality of positions by dropping the arm into one or another of a series of notches 128' associated with the slot 128. By this means, the position of the triangular plate member 123 relative to the other elements of the control system may be manually adjusted.

Movement of the plate member 123 in response to manual operation of the handle 130 simultaneously depresses or elevates each of the flaperons 95, through interconnecting links 122 and 122' the same amount to change the effective camber of both wings 70 to vary their lift characteristics, as is well understood in the art; and thus this portion of the control system by the simultaneous control of the flaperons 95 provides the function of conventional flaps or other high lift devices.

To effect differential action of the flaperons 95 for lateral control, a projection 123' of the plate 123 extends forward of the pivot 124 and is pivotally connected to a link 131 which in turn is pivotally connected to a bell crank 132 carried by and rotatable with the shaft 113. Thus rotation of the link 131 in response to manual actuation of the control wheel 110, rotates the triangular plate member 123 about its pivot 124 and moves the flaperons differentially, that is, one will move up as the other moves down and vice versa. The differential control of the flaperons 95 for lateral control is obtained in this system regardless of the relative neutral position of the flaperons 95 with respect to the wing 70, as established by the position of the lever handle 130, so that lateral control of the vehicle is obtained even when the flaperons 95 are in the fully depressed or "drooped" position.

The lateral and directional control systems are coordinated so that flaperons 95 and rudder 97 are simultaneously operated by rotation of the control wheel 110 in such a manner that the rudder is deflected to produce a given amount of yawing or directional movement to the vehicle for any lateral moment produced by the flaperons 95, and in the proper direction. This coordination of controls is accomplished by means of a link 133 which is universally pivoted at its lower end to the projection 123' of plate 123, between the pivot point 124 and the attachment point to the link 131, and at its other end to a link 134 which in turn rotates a bell crank 135 pinned to the elevator control tube 105. The geometry of the system comprising the bell crank 135 and the links 133 and 134 is such that fore-and-aft movement of the control tube 105, which occurs when the elevators 99 are to be operated, merely displaces the links 133 and 134 in the same direction without affecting the position of the triangular plate member 123, while rotation of the plate member 123, which occurs when the flaperons are differentially actuated, rotates the control tube 105 without affecting the relative longitudinal position of the control tube 105, or the setting of the elevators 99.

The rudder 97 is adapted to be rotated about its vertical axis in response to rotation of the control tube 105. An operative connection is had between the rudder 97 and control tube 105 through a rudder horn 136 pinned to a rudder torque tube 137, an attachment fitting 140 fastened to the rear end of the control tube 105 and a pair of links 138 and 139 interconnecting the tube 137 and the fitting 140. The geometry of this system is such that longitudinal movement of the control tube 105 to actuate the elevators 99 displaces the links 138 and 139 without rotation of the rudder horn 136 (or the rudder 97 controlled thereby) while rotation of the control tube 105 effects rotation of the rudder horn 136 and the rudder 97 without affecting the position of elevators 99.

It will be apparent from the foregoing description that the flight control system comprises three distinct components: (a) a longitudinal control operable by fore-and-aft movement of the control column 100, (b) a combined lateral and directional control operable by rotation of the control wheel 110, and (c) a control for changing lift characteristics operable in response to movement of the handle 130. The arrangement may be further characterized as a two control system employing a conventional elevator for longitudinal control and a combined rudder and aileron system to produce coordinated lateral and directional movement, in which the ailerons are capable of being "drooped" to provide high-lift characteristics for take-off and landing, thus serving as "flaperons."

It is to be particularly noted that the entire flight control system is supported by the flight component B and is completely independent of the control system of the automotive component A, thus facilitating the assembly and dis-assembly of the vehicle, and eliminating the mechanical complications inherent in inter-connected systems.

This invention also provides that the engine controls for the engine 75 and the flight instruments are supported as part of the flight component B and are independent of the automotive component A or its controls. A flight control panel 145 is supported by the primary structure of flight component B, in suitable manner, and is adapted to extend through opening 90 in the roof of body 10, along with control column 100, when the major components are assembled. The control panel 145 will carry the usual flight instruments, indicated generally at 146, and will position these instruments above the head of the pilot but in a readily readable position, as is best shown in Figure 5.

The controls for the engine 75 are conventional and their particular construction form no part of this invention and they are not shown in the drawings. These controls will be operated from the flight control panel 145.

The controls for the motor 12 carried by the automotive unit A are not shown and are likewise of conventional design and construction and form no part of this invention, and are located within easy access of the driver upon the automobile instrument panel 28a, which panel 28a carries the usual automotive instruments indicated generally at 147.

As best seen in Figure 8, a fairing 148, generally cap-like or oval in shape, depends from the flight component B and is adapted to fit over and snugly enclose substantially the entire roof portion of the body 10 of the automotive component A. The shape of the fairing 148 tends to reduce drag, and hides the attachment points between the two major components A and B and generally adds to the appearance of the combination, continuing the streamline effect of the automotive unit A.

In Figure 5 there is illustrated a form of steering mechanism which is best utilized when the vehicle of the present invention is engaged in taxiing operations. It may readily be actuated by one hand of the operator while with the other he controls the movable control surfaces provided on the flight unit B. Steering lever 26 is pivotally connected to steering column 27 so that it may be moved to stowed position (as shown in dotted outline in Figure 5) when the device is serving as an airborne vehicle. When the autoplane of the present invention is to serve as a ground vehicle, with the portable flight unit B removed, another form of steering device is better utilized. This latter form is shown in Figure 7 and comprises a conventional steering wheel 150 carried by a shaft 151 which shaft 151 is adapted to have a telescoping engagement with column 27. If the driver desires, this latter form of steering apparatus may be maintained at all times in the ship, being telescoped into a stowed position, as shown in dotted outline, to be out of the way when in flight.

Figure 3:
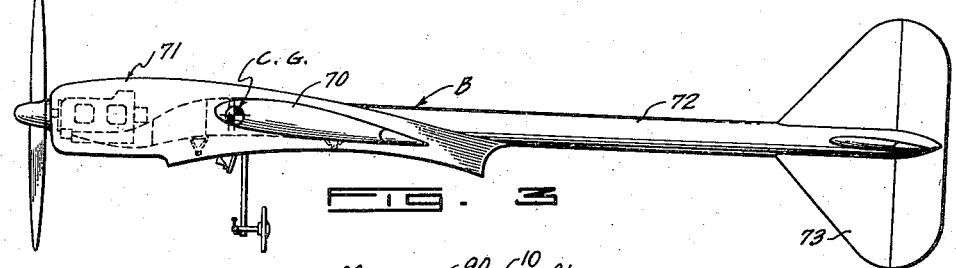
Figure 3 is a side elevation of the flight component per se.
Figure 4:
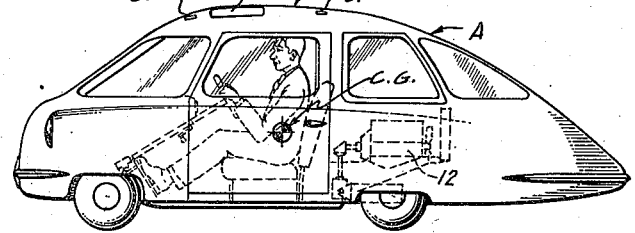
Figure 4 is a side elevation of the automotive component per se.

Figures 2, 3, and 4 illustrate the positions of the various centers of gravity of the flight unit B, of the automobile unit A, and of the combination of these two units. As has been pointed out hereinbefore the location of two principal loads, the motors 75 and 12 on opposite sides of the center of gravity of the assembled units, the positioning of the seating arrangement 17 between the motors, and the disposal of the wing section substantially directly over the seat 17, assists in locating the center of gravity in a desirable position for satisfactory performance of the vehicle.

An airplane-automobile combination has been herein described which incorporates desirable aerodynamical and mechanical operating efficiency and maintains passenger comfort. A novel design is utilized providing low weight but advantageously possessing high strength. The design and construction employed in the present invention provides a vehicle which satisfactorily performs both as a ground device and as an airborne vehicle and performs with safety and ease.

While certain preferred embodiments of the invention have been specifically disclosed, it is understood that the invention is not limited thereto as many variations will be readily apparent to those skilled in the art and the invention is to be given its broadest possible interpretation within the terms of the following claim.

I claim:

In an autoplane comprising in combination an automotive unit and a flight unit, said automotive unit comprising a central load bearing tubular frame, a body of generally shell-like construction supported by said frame, steering and drive ground-engaging wheels carried by said body, a motor mounted in said body rearwardly of said frame and being operatively connected to said drive wheels, means for supporting said motor on said load bearing frame, seating means within said body disposed forwardly of said motor and supported upon said frame, said flight unit comprising a transverse tubular wing spar and a tubular tail boom connected to said wing spar substantially centrally thereof, wings provided on said wing spar, an empennage supported by said tail boom, means connecting said flight unit to said load bearing frame with the wing disposed substantially directly over the seating means, a motor for driving a propeller carried by said flight unit, means mounting said motor forwardly of said wings, said motor on said automotive unit being located rearwardly of the center of gravity of the autoplane and said motor carried by said flight unit being located forwardly of said center of gravity.

THEODORE P. HALL.

REFERENCES CITED

The following references are of record in the file of this patent:

UNITED STATES PATENTS

| Number | Name | Date |
|---|---|---|
| 1,348,548 | Dominicis et al. | Aug. 13, 1920 |
| 2,156,288 | Holliday | May 2, 1939 |
| 2,410,234 | Read et al. | Oct. 20, 1946 |

FOREIGN PATENTS

| Number | Country | Date |
|---|---|---|
| 559,819 | Great Britain | Mar. 7, 1944 |
| 820,336 | France | July 26, 1937 |

OTHER REFERENCES

Warner: "Airplane Design," 1st edition, 1927, pp. 242 and 243.